(12) United States Patent
Li

(10) Patent No.: US 6,594,703 B1
(45) Date of Patent: Jul. 15, 2003

(54) APPARATUS AND METHOD OF MINIMIZING INTERNAL MULTICAST TRAFFIC

(76) Inventor: Yunzhou Li, 351 Pawtucket Blvd. Unit 7, Lowell, MA (US) 01854

( * ) Notice: Subject to any disclaimer, the term of this patent is extended or adjusted under 35 U.S.C. 154(b) by 0 days.

(21) Appl. No.: 09/474,477

(22) Filed: Dec. 29, 1999

Related U.S. Application Data

(60) Provisional application No. 60/137,195, filed on Jun. 2, 1999.

(51) Int. Cl.[7] ............................................. G06F 15/16
(52) U.S. Cl. .................... 709/235; 709/224; 709/227; 709/230; 709/248; 370/245; 370/252
(58) Field of Search ................................ 709/227, 224, 709/235; 370/245, 252

(56) References Cited

U.S. PATENT DOCUMENTS

| | | | | |
|---|---|---|---|---|
| 5,959,989 A | * | 9/1999 | Gleeson et al. ............ | 370/390 |
| 6,108,782 A | * | 8/2000 | Fletcher et al. ............ | 370/245 |
| 6,141,347 A | * | 10/2000 | Shaughnessy et al. ...... | 370/312 |
| 6,301,662 B1 | * | 10/2001 | Hardjono .................... | 713/176 |
| 6,331,983 B1 | * | 12/2001 | Haggerty et al. ........... | 370/400 |
| 6,385,647 B1 | * | 5/2002 | Willis et al. ................ | 709/217 |

\* cited by examiner

*Primary Examiner*—David Wiley
*Assistant Examiner*—Phuoc Nguyen
(74) *Attorney, Agent, or Firm*—Steubing McGuinness & Manaras LLP

(57) ABSTRACT

An apparatus and method of minimizing multicast traffic in a given multicast domain, the given multicast domain having a plurality of network devices, the plurality of network devices including at least one responsible network device, the responsible network device being responsible for at least one particular multicast traffic, configures a network device in the multicast domain to coordinate multicast messages sent to and from the multicast domain and generates a peering relationship between the configured network device and each responsible network device. The peering relationship ensures that a responsible network device receives multicast messages which reference its particular multicast traffic only.

45 Claims, 5 Drawing Sheets

APPARATUS AND METHOD OF MINIMIZING INTERNAL MULTICAST TRAFFIC

PRIORITY

This application claims priority from co-pending provisional U.S. patent application Ser. No. 60/137,195, filed Jun. 2, 1999, entitled "APPARATUS AND METHOD FOR MINIMIZING INTERNAL MULTICAST TRAFFIC" the disclosure of which is incorporated herein, in its entirety, by reference.

CROSS REFERENCE TO RELATED APPLICATIONS

This application is related to U.S. pat. application Ser. No. 09/474,203 filed on even date herewith, entitled "APPARATUS AND METHOD OF IMPLEMENTING MULTICAST SECURITY BETWEEN MULTICAST DOMAINS" naming Yunzhou Li, Billy C. Ng, and Jyothi Hayes as inventors, the disclosure of which is incorporated herein, in its entirety, by reference.

FIELD OF THE INVENTION

The invention generally relates to networks and, more particularly, the invention relates to multicast traffic across a computer network.

BACKGROUND OF THE INVENTION

Multicasting is a known method of transmitting information to selected groups of users across a network, such as the Internet. For example, the transmission of an E-mail message to a group of users, each user being listed on a mailing list, uses multicasting principles. Video conferencing and teleconferencing also use multicasting principles and, accordingly, are often referred to as "multiconferencing."

Due to increased demand for uses utilizing multicasting principles, protocols such as the Internet Group Multicast Protocol ("IGMP") have been developed and refined to support multicasting over a Transmission Control Protocol/Internet Protocol ("TCP/IP") network, such as the Internet. The new protocols, such as IGMP, allow users to easily create and join multicasting sessions ("multicasts"). Accordingly, the number of multicasts transmitted over a network have increased.

The increase in the number of multicasts results in an increase in the overhead needed to support multicasting. For example, Multicast Source Discover Protocol ("MSDP") requires, in a Protocol Independent Multicast-Sparse Mode ("PIM-SM") domain, a network device responsible for a particular multicast, referred to as a Rendezvous Point ("RP") for the multicast, to peer with other RPs in the PIM-SM domain. As a result, all multicast messages sent to the PIM-SM domain are forwarded to all the RPs in the PIM-SM domain, regardless of whether the RP is responsible for the particular multicast referenced in the multicast message. Accordingly, an increase in the number of multicasts, as well as an increase in the number of RPs, results in an increase in the number of internal multicast messages in the PIM-SM domain.

Thus, a need exists for minimizing the overhead needed to support multicasting. In particular, a need exists for minimizing internal multicast traffic.

SUMMARY OF THE INVENTION

In accordance with one aspect of the invention, an apparatus and method of minimizing multicast traffic in a given multicast domain, the given multicast domain having a plurality of network devices, the plurality of network devices including at least one responsible network device, the responsible network device being responsible for at least one particular multicast traffic, configures a network device in the multicast domain to coordinate multicast messages sent to and from the multicast domain and generates a peering relationship between the configured network device and each responsible network device. The peering relationship ensures that a responsible network device receives multicast messages which reference its particular multicast traffic only.

In an alternate embodiment of the invention, the apparatus and method of minimizing multicast traffic in a given multicast domain receives at the configured network device a multicast message sent to the multicast domain and forwards the received multicast message to the responsible network device for the multicast traffic referenced in the received multicast message. In a further alternate embodiment of the invention, the apparatus and method of minimizing multicast traffic in a given multicast domain receives at the configured network device a multicast message sent from a responsible network device in the multicast domain and forwards the received multicast message to at least one other multicast domain.

In accordance with another embodiment of the invention, an apparatus and method of minimizing multicast traffic in a network is provided with the network having a given multicast domain, the given multicast domain having a plurality of network devices, the plurality of network devices including at least one responsible network device, and the responsible network device being responsible for at least one particular multicast traffic. In the embodiment, the apparatus and method configures a network device in the given multicast domain to coordinate multicast messages sent to and from the given multicast domain, generates a peering relationship between the configured network device and each responsible network device, the peering relationship ensuring that a responsible network device receives multicast messages which reference its particular multicast traffic only, sends a multicast message to the given multicast domain, receives the multicast message at the configured network device, and forwards the received multicast message to the responsible network device for the multicast traffic referenced in the received multicast message.

In an alternate embodiment of the invention, the apparatus and method of minimizing multicast traffic in a network generates a peering relationship between the configured network device and a network device in another multicast domain. In a further alternate embodiment of the invention, the apparatus and method of minimizing multicast traffic in a network receives at the configured network device a second multicast message sent from a responsible network device in the given multicast domain and forwards the received multicast message to the peered network device in the another multicast domain.

In another embodiment of the invention, the apparatus and method of minimizing multicast traffic in a given multicast domain, or in a network, constructs an information message that alerts network devices of the coordinating capabilities of the configured network device and forwards the information message to at least one network device. In one alternate embodiment of the invention, the information message is a part of a multicast protocol message. In a further embodiment of the invention, one or more bits in one or more fields of the multicast protocol message are set as alerts for the coordinating capabilities of the configured network device.

In alternate embodiments of the invention, the configured network device generates a peering relationship with all of the responsible network devices in the multicast domain, thereby coordinating all of the multicast messages in the multicast domain or, in the alternative, the configured network device generates a peering relationship with a subset of the responsible network devices in the multicast domain, thereby coordinating a subset of the multicast messages in the multicast domain.

In another alternate embodiment of the invention, the configured network device is also a responsible network device. In a further alternate embodiment of the invention, the given multicast domain is a protocol independent multicast domain. In a still further alternative embodiment of the invention, the given multicast domain is part of a Multicast Source Discovery Protocol backbone.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE INVENTION

In accordance with an embodiment of the invention, internal multicast traffic is minimized, particularly in Protocol Independent Multicast-Sparse Mode ("PIM-SM") domains, with the use of group specific internal peering. Group specific internal peering occurs between network devices in a multicast domain and, as a result of the peering, ensures that a network device responsible for a particular multicast, referred to as a Rendezvous Point ("RP") for the multicast, receives only the multicast messages which reference the particular multicast for which the RP is responsible.

Figure 1:
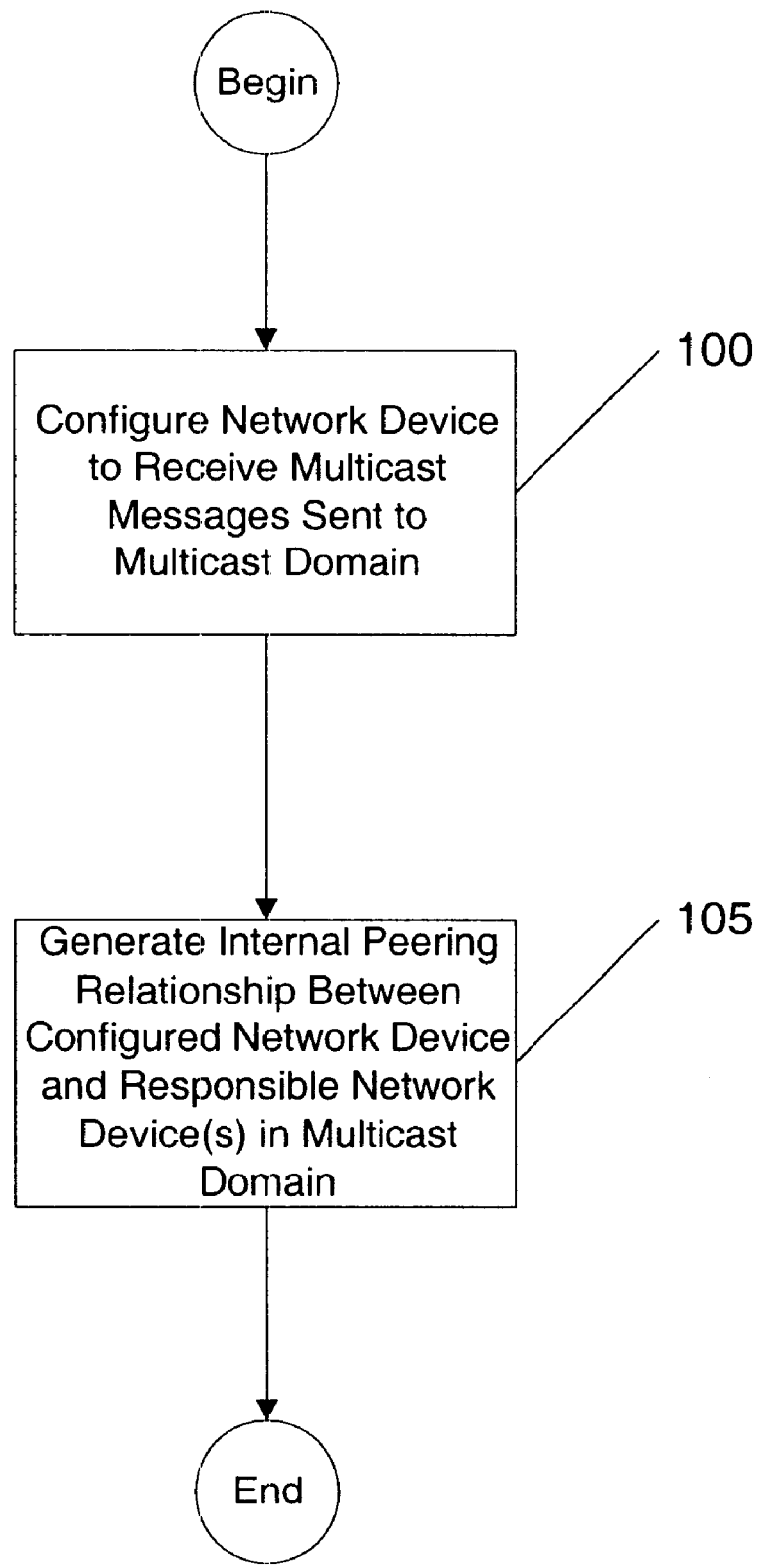
FIG. 1 shows an exemplary process for implementing various embodiments of the invention in a particular multicast domain.

FIG. 1 shows an exemplary process for implementing various embodiments of the invention in a particular multicast domain. The process begins at step 100, in which a network device is configured to receive multicast messages sent to and from its multicast domain. The process continues at step 105, in which an internal peering relationship is generated between the configured network device and each network device in the multicast domain responsible for particular multicast traffic. The internal peering relationship ensures that a responsible network device receives only multicast messages which reference the particular multicast traffic. Thus, when a responsible network device sends a multicast message, the responsible network device sends the multicast message to only the configured network device. The configured network device then sends the multicast message to at least one other downstream multicast domain. In a similar manner, when a multicast message is sent to the multicast domain, the configured network device receives the multicast message and forwards the received multicast message to only the responsible network device for the multicast traffic referenced in the multicast message.

The configured network device may generate an internal peering relationship with all of the responsible network devices in the multicast domain. In this exemplary embodiment of the invention, the configured network device coordinates all of the multicast messages sent to and from the multicast domain. In the alternative, the configured network device for a multicast domain may generate an internal peering relationship with a subset of the responsible network devices in the multicast domain. In this alternate embodiment of the invention, the configured network device coordinates only that subset of the multicast messages sent to and from the multicast domain.

Figure 2:
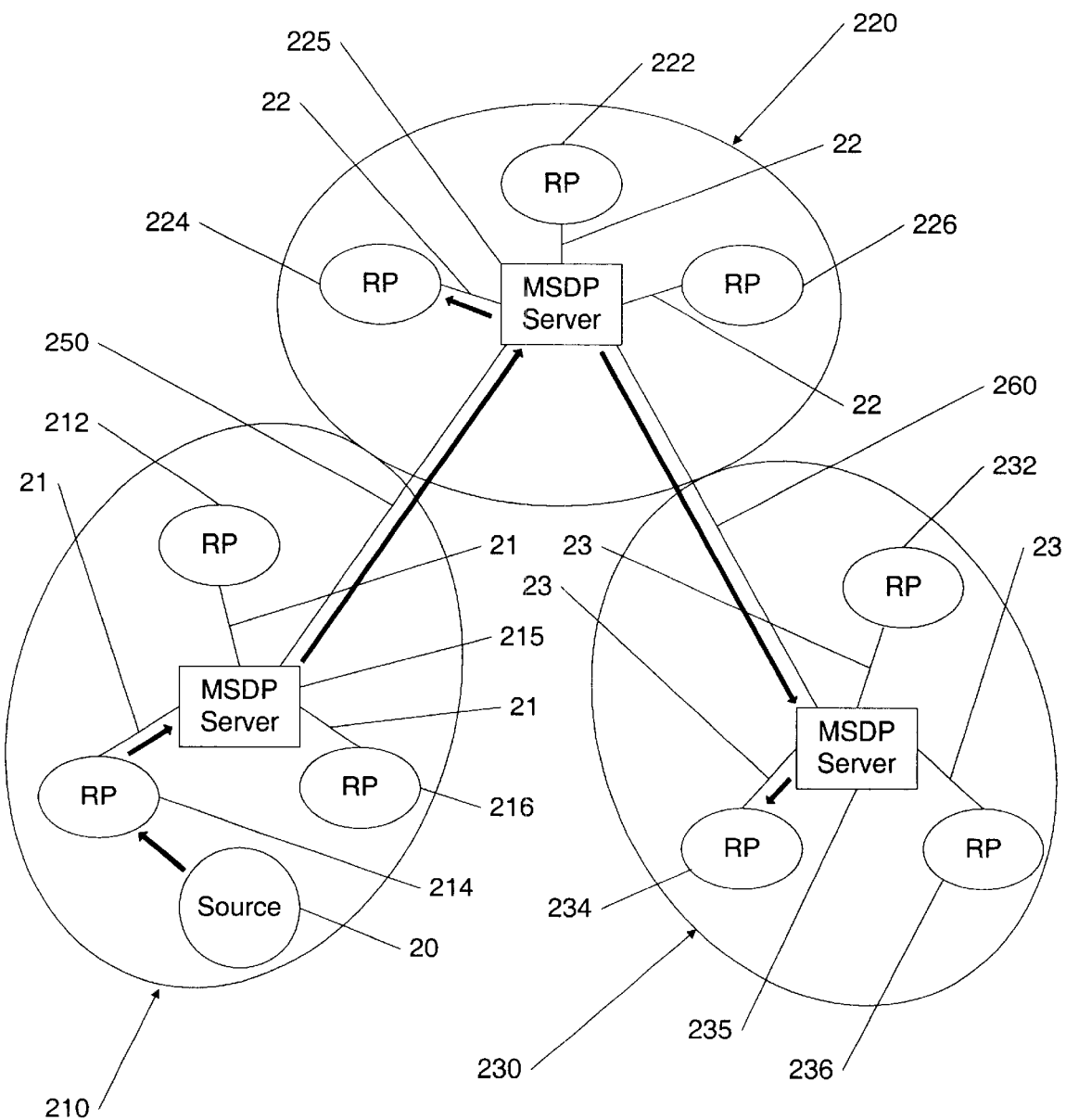
FIG. 2 schematically shows an exemplary Multicast Source Discovery Protocol ("MSDP") backbone, in which various embodiments of the invention may be implemented.

FIG. 2 schematically shows an exemplary Multicast Source Discovery Protocol ("MSDP") backbone, in which various embodiments of the invention may be implemented. MSDP backbone 200 includes three multicast domains, domain 210, domain 220, and domain 230. In this exemplary embodiment, domains 210, 220, and 230 are PIM-SM domains.

Domain 210 includes three network devices responsible for multicast traffic, Rendezvous Point ("RP") 212, RP 214, and RP 216. In particular, RP 212 is responsible for multicasts in the range of addresses from 226.10.0.0 to 226.10.255.255, denoted as 226.10.0.0/16. The range of multicast addresses an RP is responsible for is referred to as the RP's group scope. The group scope of RP 214 is 226.20.0.0/16, i.e., from 226.20.0.0 to 226.20.255.255, and the group scope of RP 216 is 226.30.0.0/16, i.e., from 226.30.0.0 to 226.30.255.255. In addition, domain 210 includes a configured network device, MSDP Server 215, and a source for multicast traffic, source 20. The address of the multicast being sent from source 20 is 226.20.20.1.

Domain 220 also includes three network devices responsible for multicast traffic, RP 222, RP 224, and RP 226. In particular, the group scope for RP 222 is 225.0.0.0/8, i.e., from 225.0.0.0 to 225.255.255.255. The group scope of RP 224 is 226.0.0.0/8, i.e., from 226.0.0.0 to 226.255.255.255, and the group scope of RP 226 is 227.0.0.0/8, i.e., from 227.0.0.0 to 227.255.255.255. In addition, domain 220 includes a configured network device, MSDP Server 225.

Similar to domain 220, domain 230 also includes three network devices responsible for multicast traffic, RP 232, RP 234, and RP 236, and one configured network device, MSDP Server 235. In domain 230, the group scope of RP 232 is 226.20.10.0/24, i.e., from 226.20.10.0 to 226.20.10.255. The group scope of RP 234 is 226.20.20.0/24, i.e., from 226.20.20.0 to 226.20.20.255, and the group scope of RP 236 is 226.20.30.0/24, i.e., from 226.20.30.0 to 226.20.30.255.

Connectors 250 and 260 show the peering relationship between the MSDP Servers. For example, MSDP Server 225 and MSDP Server 215 have an external peering relationship with each other. An external peering relationship occurs between MSDP Servers in neighboring Protocol Independent Multicast ("PIM") domains. If the neighboring PIM domain does not include a MSDP Server, the MSDP Server peers with a RP in the neighboring domain.

In contrast, connectors 21, 22, and 23 show the peering relationship between a MSDP Server and a RP. For example, MSDP Server 225 has an internal peering relationship with RP 222. An internal peering relationship occurs between a MSDP Server in a multicast domain and the network devices in the multicast domain responsible for particular multicast traffic, i.e., the RPs.

Figure 3:
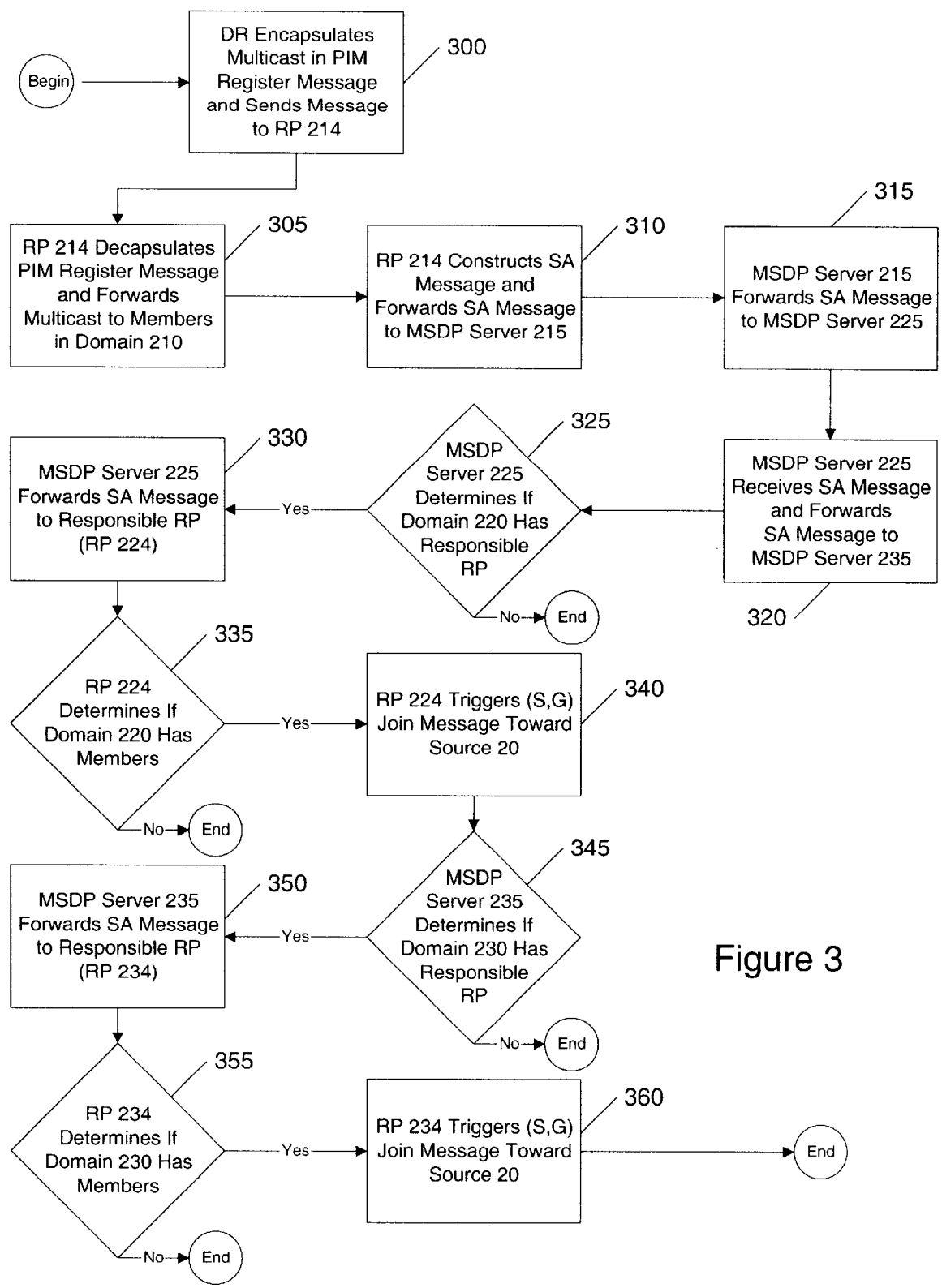
FIG. 3 shows an exemplary process for implementing various embodiments of the invention between multicast domains in the exemplary MSDP backbone shown in FIG. 2.

FIG. 3 shows an exemplary process for implementing various embodiments of the invention between multicast domains in MSDP backbone 200. The process begins at step 300, in which the network device responsible for source 20, referred to as a designated router (not shown), encapsulates a multicast from source 20 in a message, referred to as a PIM Register message, and sends the PIM Register message to RP 214. The process continues at step 305, in which RP 214 decapsulates the message and forwards the multicast to those users in domain 210 who have "joined" the multicast, i.e., those users who have become members of the multicast in domain 210. A user joins a multicast in numerous ways. For example, a user may join a video conference by entering a user name and password. In addition, at step 310, RP 214 constructs a message, referred to as a Source Active ("SA") message, and forwards the SA message to MSDP Server 215. The SA message includes, among other information, the address of the source, the address of the multicast traffic, and the address of the RP forwarding the SA message. At step 315, MSDP Server 215 forwards the SA message to MSDP Server 225. MSDP Server 215 does not forward the SA message to the other RPs in domain 210, i.e., RP 212 and RP 216.

The process now continues at domain 220. At step 320, MSDP Server 225 receives the SA message and forwards the SA message to MSDP Server 235, an external peer. In a MSDP backbone, a MSDP Server may forward multicast messages to MSDP Servers, or RPs, in neighboring PIM domains using Reverse Path Forwarding ("RPF") flooding, a known means of forwarding multicast messages. In addition, at step 325, MSDP Server 225 determines which RP, if any, in domain 220 is responsible for the multicast traffic referenced in the SA message, referred to as looking for the responsible RP in the RP Set Table. As noted above, the address of the multicast being sent from source 20 is 226.20.20.1. In domain 220, RP 224 is responsible for multicasts in the range of addresses from 226.0.0.0 to 226.255.255.255. Thus, in domain 220, RP 224 is responsible for the multicast being sent from source 20 ("multicast 226.20.20.1"). Accordingly, at step 330, MSDP Server 225 forwards the SA message to RP 224. At step 335, RP 224 determines whether users in domain 220 have joined multicast 226.20.20.1, referred to as determining whether a (*, G) state with a non-empty outgoing interface list exists where G is multicast 226.20.20.1. Because users in domain 220 have joined multicast 226.20.20.1, i.e., such a (*, G) state exists, then, at step 340, RP 224 sends a message towards source 20 that RP 224 is part of the "tree" for multicast 226.20.20.1, referred to as triggering a (S, G) join where S is source 20 and G is multicast 226.20.20.1.

The process now continues at domain 230. MSDP Server 235, in domain 230, does not have an external peering relationship with another MSDP Server, or RP, in a downstream PIM domain. Thus, MSDP Server 235 stops forwarding the SA message to other multicast domains. As a result, the process continues at step 345, in which MSDP Server 235 looks in the RP Set Table to determine which RP, if any, in domain 230 is responsible for multicast 226.20.20.1. In domain 230, RP 234 is responsible for multicasts in the range of addresses from 226.20.20.0 to 226.20.20.255. Thus, in domain 230, RP 234 is responsible for multicast 226.20.20.1. Accordingly, at step 350, MSDP Server 235 forwards the SA message to RP 234. At step 355, RP 234 determines whether a (*, G) state with a non-empty outgoing interface list exists where G is multicast 226.20.20.1. Because users in domain 230 have joined multicast 226.20.20.1, i.e., such a (*, G) state exists, then, at step 360, RP 234 triggers a (S, G) join, where S is source 20 and G is multicast 226.20.20.1, towards source 20, thereby becoming part of the "tree" for multicast 226.20.20.1.

At this point in the process, the shared tree for multicast 226.20.20.1 is complete for MSDP backbone 200. Multicast 226.20.20.1 will be forwarded from source 20 to RP 214 in domain 210, to RP 224 in domain 220, and to RP 234 in domain 230. In turn, RP 214 will forward the multicast to the members of the multicast in domain 210, RP 224 will forward the multicast to the members of the multicast in domain 220, and RP 234 will forward the multicast to the members of the multicast in domain 230.

In this exemplary embodiment of the invention, MSDP Servers 215, 225, and 235 are configured as generic Candidate Rendezvous Points ("° C-RPs"). As generic C-RPs, their group scope is 224.0.0.0/4, i e., from 224.0.0.0 to 239.255.255.255, the entire range of addresses for multicast traffic. A C-RP sends a periodic message to the bootstrap router for a PIM domain, referred to as a C-RP Advertisement message, that informs the bootstrap router of, inter alia, the addresses of the other RPs in the PIM domain. From these C-RP Advertisement messages, the bootstrap router constructs, inter alia, the RP Set Table, discussed above.

MSDP Servers 215, 225, and 235 may also be configured to be the lowest priority network device in their respective PIM domain. As the lowest priority network device, a MSDP Server would be the least likely network device to be elected as a RP responsible for particular multicast traffic. A network device may be configured to be both a MSDP Server and a RP for particular multicast traffic.

The C-RP Advertisement message may also be used to inform the bootstrap router of the external peering capabilities of a MSDP Server. In particular, a MSDP Server sets a S-bit in the reserved field of the C-RP Advertisement message. The format for a C-RP Advertisement message with a S-bit set in the reserved field is shown below:

```
                    1                   2                   3
0 1 2 3 4 5 6 7 8 9 0 1 2 3 4 5 6 7 8 9 0 1 2 3 4 5 6 7 8 9 0 1
    PIM Ver        Type        S         Reserved       Check Sum
            Prefix-Cnt             Priority              Holdtime
                         Encoded-Unicast-RP-Address
                         Encoded-Group Address-1
                         Encoded-Group Address-n
```

When the S-bit is set, the C-RP sending the C-RP Advertisement message is capable of coordinating multicast messages. For example, when a MSDP Server, configured as a C-RP, sets the S-bit in its C-RP Advertisement message, the MSDP Server is capable of forming external peering relationships with another MSDP Server, or RP, in a neighboring PIM domain.

In turn, when a bootstrap router receives a C-RP Advertisement message with the S-bit set, the bootstrap router sets a S-bit in the reserved field of the RP fragment for the C-RP sending the C-RP Advertisement message. In this manner, all network devices determine the coordinating capabilities of the C-RP sending the C-RP Advertisement message. For example, all network devices determine that an MSDP Server, configured as a C-RP, is capable of forming external peering relationships with another MSDP Server, or RP, in a neighboring PIM domain. The format for a bootstrap message with a S-bit set in the reserved field of the RP fragment for C-RPs sending the C-RP Advertisement message is shown below:

module 405. In this exemplary embodiment of the invention, configuration module 400 configures a network device in, for example, domain 220 to coordinate multicast messages sent to and from domain 220. Peering module 405 generates an internal peering relationship between the configured network device, MSDP Server 225, and the responsible RPs in domain 220, i.e., RP 222, RP 224, and RP 226. Peering module 405 also generates an external relationship between MSDP Server 225 and, for example, MSDP Server 235.

A configuration module may configure a network device to coordinate all of the multicast messages sent to and from a multicast domain, or it may be configure a network device to coordinate a subset of the multicast messages sent to and from a multicast domain. A peering module generates a peering relationship based upon the configured network device. In particular, if the configured network device is configured to coordinate all of the multicast messages sent to and from a multicast domain, then the peering module generates an internal peering relationship between the configured network device and all the RPs responsible for

```
                                   1                   2                   3
 0 1 2 3 4 5 6 7 8 9 0 1 2 3 4 5 6 7 8 9 0 1 2 3 4 5 6 7 8 9 0 1
 PIM Ver           Type                Reserved              Check Sum
          Fragment Tag             Hash Mask Len             BSR-Priority
                              Encoded-Unicast-BSR-Address
                              Encoded-Group Address-1
          RP-Count                    Frag RP-Cnt-1          Reserved
                              Encoded-Unicast-RP-Address-1
 RP1-Holdtime               RP1-Priority        S            Reserved
                              Encoded-Unicast-RP-Address-2
 RP2-Holdtime               RP2-Priority        S            Reserved
                              Encoded-Unicast-RP-Address-m
 RPm-Holdtime               RPm-Priority        S            Reserved
                              Encoded-Group Address-2
                              Encoded-Group Address-n
          RP-Count-n                  Frag RP-Cnt-n          Reserved
                              Encoded-Unicast-RP-Address-1
 RP1-Holdtime               RP1-Priority        S            Reserved
                              Encoded-Unicast-RP-Address-2
 RP2-Holdtime               RP2-Priority        S            Reserved
                              Encoded-Unicast-RP-Address-m
 RPm-Holdtime               RPm-Priority        S            Reserved
```

A PIM domain may contain numerous active multicast sources. When a MSDP Server wants to know the active multicast sources in a PIN domain, for example, when the MSDP Server has rebooted, the MSDP Server sends a Source Active Request ("SA Request") message, a known multicast protocol message, to the RPs in the PIM domain responsible for multicasts. In turn, the responsible RPs forward a Source Active Response ("SA Response) message, also a known multicast protocol message, to the MSDP Server. The SA Response message includes, inter alia, the addresses of the active multicast sources. The MSDP Server may also send a SA Request message to an external peer, for example, a MSDP Server in a neighboring PIM domain. In addition, a responsible RP may send a SA Request message to a MSDP Server, for example, when the responsible RP receives a message from a user to join a particular multicast, referred to as a PIM Join message. Upon receiving the message, the RP triggers a (*,G) state to join the shared tree, as discussed above in reference to FIG. 3 (steps 335, 340, 355. and 360).

Figure 4:
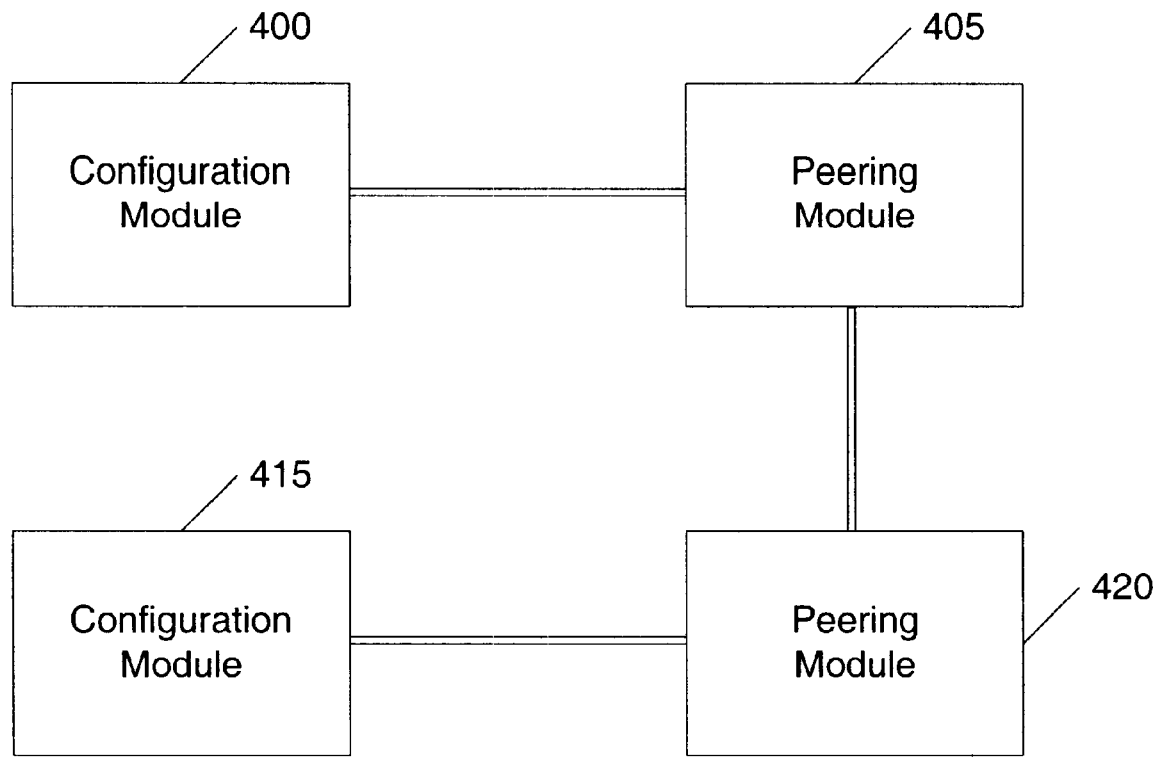
FIG. 4 is a block diagram of an exemplary apparatus for implementing various embodiments of the invention between multicast domains in the exemplary MSDP backbone shown in FIG. 2.

FIG. 4 is a block diagram of an exemplary apparatus for implementing various embodiments of the invention between multicast domains in MSDP backbone 200. The apparatus includes configuration module 400 and peering multicast traffic in the multicast domain. However, if the configured network device is configured to coordinate a subset of the multicast messages sent to and from a multicast domain, then the peering module generates an internal peering relationship between the configured network device and the relevant subset of the RPs responsible for multicast traffic in the multicast domain. For example, if a configured network device is configured to coordinate multicast messages for the range of addresses from 226.20.20.0 to 226.20.20.255, then the peering module generates an internal peering relationship between the configured network device and RPs responsible for multicasts in the range of addresses from 226.20.20.0 to 226.20.20.255.

The apparatus further includes configuration module 415 and peering module 420. In this exemplary embodiment of the invention, configuration module 415 configures a network device in domain 230 to coordinate multicast messages sent to and from domain 230. Peering module 420 generates an internal peering relationship between the configured network device, MSDP Server 235, and the responsible RPs in domain 230, i.e., RP 232, RP 234, and RP 236.

Figure 5:
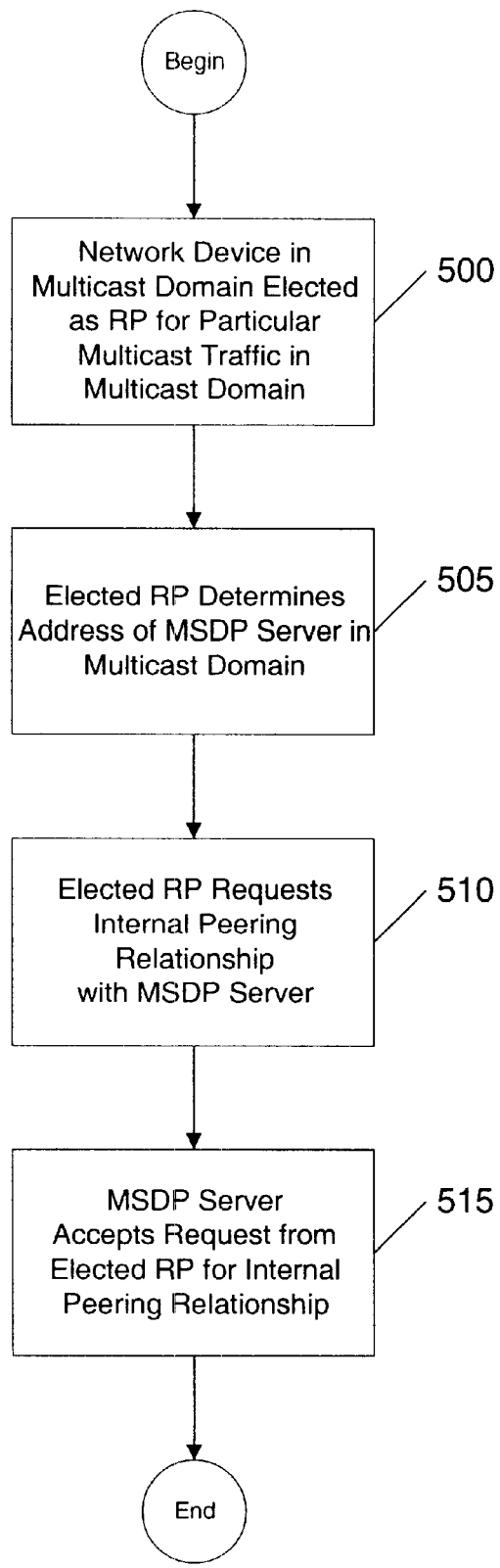
FIG. 5 shows an exemplary process for setting up an internal peering relationship between network devices in the exemplary MSDP backbone shown in FIG. 2.

FIG. 5 shows an exemplary process for setting up an internal peering relationship between a responsible RP and a MSDP Server in MSDP backbone 200. The process begins at step 500, in which a network device, for example, RP 222, is elected as a RP for particular multicast traffic in MSDP backbone 200. In an MSDP backbone, a network device is elected as a RP for particular multicast traffic via a bootstrap message.

The process continues at step 505, in which RP 222 determines the address of the MSDP Server, or MSDP Servers, in the PIM domain. Once again, in an MSDP backbone, a network device may determine the address of a MSDP Server for a PIM domain from the bootstrap message, for example, the S-bit in the reserved field (of the RP fragment) in the bootstrap message. If a responsible RP determines the PIM domain has more than one MSDP Server, the responsible RP should select the MSDP Server with the highest priority. When the MSDP Servers are at the same priority, the responsible RP should run the hash function, a known algorithm, between the MSDP Servers. The responsible RP should then select the MSDP Server with the highest hash value.

Next, at step 510, RP 222 requests an internal peering relationship with MSDP Server 225, the selected MSDP Server for this exemplary embodiment of the invention. The process concludes at step 515, in which MSDP Server 225 accepts the request from RP 222 for an internal peering relationship. A MSDP Server may not automatically accept a network device's request for an internal peering relationship. For example, policy considerations may determine whether a MSDP Server automatically accepts a network device's request for an internal peering relationship. Under certain policies, a MSDP Server may decline a network device's request for an internal peering relationship. When the responsible RP is also the selected MSDP Server, there is no need for setting up an internal peering relationship.

The various embodiments of the invention may be implemented in any conventional computer programming language. For example, the various embodiments may be implemented in a procedural programming language (for example, "C") or an object-oriented programming language (for example, "C++"). The various embodiments of the invention may also be implemented as preprogrammed hardware elements (for example, application specific integrated circuits or digital processors), or other related components.

The various embodiments of the invention may be also implemented as a computer program product for use with a computer system. Such implementation may include a series of computer instructions fixed either on a tangible medium, such as a computer readable media (for example, a diskette, CD-ROM, ROM, or fixed disk), or transmittable to a computer system via a modem or other interface device, such as a communications adapter connected to a network over a medium. The medium may be either a tangible medium (for example, optical or analog communications lines) or a medium implemented with wireless techniques (for example, microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over the network (for example, the Internet or World Wide Web).

Although various embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of minimizing multicast tic in a given multicast domain, the given multicast domain having a plurality of network devices, the plurality of network devices including at least one responsible network device, the responsible network device being responsible for at least one particular multicast traffic, the method comprising:

configuring a network device in the multicast domain to coordinate multicast messages sent to and from the multicast domain; and generating a peering relationship between the configured network device and each responsible network device, the peering relationship ensuring that each responsible network device receives multicast messages which reference its particular multicast traffic only wherein the given multicast domain is part of a Multicast Source Discovery Protocol backbone.

2. The method according to claim 1, further comprising:

receiving at the configured network device a multicast message sent to the multicast domain; and forwarding the received multicast message to the responsible network device for the multicast traffic referenced in the received multicast message.

3. The method according to claim 1, further comprising:

receiving at the configured network device a multicast message sent from a responsible network device in the multicast domain; and forwarding the received multicast message to at least one other multicast domain.

4. The method according to claim 1 wherein the configured network device is also a responsible network device.

5. The method according to claim 1 wherein the configured network device generates a peering relationship with all of the responsible network devices in the multicast domain, thereby coordinating all of the multicast messages in the multicast domain.

6. The method according to claim 1 wherein the configured network device generates a peering relationship with a subset of the responsible network devices in the multicast domain, thereby coordinating a subset of the multicast messages in the multicast domain.

7. The method according to claim 1 wherein the given multicast domain is a protocol independent multicast domain.

8. A method of minimizing multicast traffic in a given multicast domain, the method comprising:

configuring a network device in the multicast domain to coordinate multicast messages sent to and from the multicast domain, wherein one or more bits in one or more fields of each of the multicast protocol messages arc set as the alert for the coordinating capabilities of the configured network device;

constructing an information message that alerts network devices of the coordinating capabilities of the configured network device; and forwarding the information message to at least one network device.

9. The method according to claim 8 wherein the information message is a part of a multicast protocol message.

10. A method of minimizing multicast traffic in a network, the network having a given multicast domain, the given multicast domain having a plurality of network devices, the plurality of network devices including at least one responsible network device, the responsible network device being responsible for at least one particular multicast traffic, the method comprising:
   configuring a network device in a given multicast domain to coordinate multicast messages sent to and from the given multicast domain, wherein the given multicast domain is part of a Multicast Source Discovery Protocol backbone;
   generating a peering relationship between the configured network device and each responsible network device, the peering relationship ensuring that each responsible network device receives multicast messages which reference its particular multicast traffic only;
   sending a multicast message to the given multicast domain;
   receiving the multicast message at the configured network device; and
   forwarding the received multicast message to the responsible network device for the multicast traffic referenced in the received multicast message.

11. The method according to claim 10, further comprising:
   generating a peering relationship between the configured network device and a network device in another multicast domain.

12. The method according to claim 11, further comprising:
   receiving at the configured network device a second multicast message sent from a responsible network device in the given multicast domain; and
   forwarding the received multicast message to the peered network device in the another multicast domain.

13. The method according to claim 10 wherein the configured network device is also a responsible network device.

14. The method according to claim 10 wherein the configured network device generates a peering relationship with all of the responsible network devices in the given multicast domain, thereby coordinating all of the multicast messages in the given multicast domain.

15. The method according to claim 10 wherein the configured network device generates a peering relationship with a subset of the responsible network devices in the given multicast domain, thereby coordinating a subset of the multicast messages in the given multicast domain.

16. The method according to claim 10 wherein the given multicast domain is a protocol independent multicast domain.

17. A method of minimizing multicast traffic in a network, the method comprising:
   configuring a network device in a given multicast domain to coordinate multicast messages sent to and from the given multicast domain, wherein one or more bits in one or more fields of each of the multicast protocol messages are set as the alert for the coordinating capabilities of the configured network device;
   constructing an information message that alerts network devices of the coordinating capabilities of the configured network device; and
   forwarding the information message to at least one network device.

18. The method according to claim 17 wherein the information message is a part of a multicast protocol message.

19. An apparatus for minimizing multicast traffic in a given multicast domain, the given multicast domain having a plurality of network devices, the plurality of network devices including at least one responsible network device, the responsible network device being responsible for at least one particular multicast traffic, the apparatus comprising:
   a constructor for configuring a network device in the multicast domain to coordinate multicast messages sent to and from the multicast domain, wherein the given multicast domain is pan of a Multicast Source Discovery Protocol backbone; and
   a generator for generating a peering relationship between the configured network device and each responsible network device, the peering relationship ensuring that a responsible network device receives multicast messages which reference its particular multicast traffic only.

20. The apparatus according to claim 19, further comprising:
   a receiver for receiving at the configured network device a multicast message sent to the multicast domain; and
   a message forwarder for forwarding the received multicast message to the responsible network device for the multicast traffic referenced in the received multicast message.

21. The apparatus according to claim 19, further comprising:
   a receiver for receiving at the configured network device a multicast message sent from a responsible network device in the multicast domain; and
   a message forwarder for forwarding the received multicast message to at least one other multicast domain.

22. The apparatus according to claim 19 wherein the configured network device is also a responsible network device.

23. The apparatus according to claim 19 wherein the configured network device generates a peering relationship with all of the responsible network devices in the multicast domain, thereby coordinating all of the multicast messages in the multicast domain.

24. The apparatus according to claim 19 wherein the configured network device generates a peering relationship with a subset of the responsible network devices in the multicast domain, thereby coordinating a subset of the multicast messages in the multicast domain.

25. The apparatus according to claim 19 wherein the given multicast domain is a protocol independent multicast domain.

26. An apparatus for minimizing multicast traffic in a given multicast domain, the apparatus comprising:
   a constructor for configuring a network device in the multicast domain to coordinate multicast messages sent to and from the multicast domain, wherein one or more bits in one or more fields of each of the multicast protocol messages are set as the alert for the coordinating capabilities of the configured network device;
   a constructor for constructing an information message that alerts network devices of the coordinating capabilities of the configured network device; and
   a message forwarder for forwarding the information message to at least one network device.

27. The apparatus according to claim 26 wherein the information message is a part of a multicast protocol message.

28. A computer prod product for minimizing multicast traffic in a given multicast domain, the given multicast domain having a plurality of network devices, the plurality of network devices including at least one responsible network device, the responsible network device being responsible for at least one particular multicast traffic, the computer program product comprising a computer usable medium having computer readable program code thereon, the computer program code including:

program code for configuring a network device in the multicast domain to coordinate multicast messages sent to and from the multicast domain, wherein the given multicast domain is part of a Multicast Source Discovery Protocol backbone; and program code for generating a peering relationship between the configured network device and each responsible network device, the peering relationship ensuring that a responsible network device receives multicast messages which reference its particular multicast traffic only.

29. The computer program product according to claim 28, further comprising:

program code for receiving at the configured network device a multicast message sent to the multicast domain; and program code for forwarding the received multicast message to the responsible network device for the multicast traffic referenced in the received multicast message.

30. The computer program product according to claim 28, further comprising:

program code for receiving at the configured network device a multicast message sent from a responsible network device in the multicast domain; and program code for forwarding the received multicast message to at least one other multicast domain.

31. The computer program product according to claim 28 wherein the configured network device is also a responsible network device.

32. The computer program product according to claim 28 wherein the configured network device generates a peering relationship with all of the responsible network devices in the multicast domain, thereby coordinating all of the multicast messages in the multicast domain.

33. The computer program product according to claim 28 wherein the configured network device generates a peering relationship with a subset of the responsible network devices in the multicast domain, thereby coordinating a subset of the multicast messages in the multicast domain.

34. The computer program product according to claim 28 wherein the given multicast domain is a protocol independent multicast domain.

35. A computer program product for minimizing multicast traffic in a given multicast domain, the computer program product comprising a computer usable medium having computer readable program code thereon, the computer program code including:

program code for configuring a network device in the multicast domain to coordinate multicast messages sent to and from the multicast domain, wherein one or more bits in one or more fields of each of the multicast protocol messages are set as the alerts for the coordinating capabilities of the configured network device;

program code for constructing an information message that alerts network devices of the coordinating capabilities of the configured network device; and program code for forwarding the information message to at least one other network device.

36. The computer program product according to claim 35 wherein the information message is a part of a multicast protocol message.

37. An apparatus for minimizing multicast traffic in a network, the network having a given domain, the given multicast domain having a plurality of network devices, the plurality of network devices including at least one responsible network device, the responsible network device being responsible for at least one particular multicast traffic, the apparatus comprising:

means for configuring a network device in a given multicast domain to coordinate multicast messages sent to and from the given multicast domain, wherein the given multicast domain is part of a Multicast Source Discovery Protocol backbone;

means for generating a peering relationship between the configured network device and each responsible network device, the peering relationship ensuring that a responsible network device receives multicast messages which reference the particular multicast traffic only;

means for sending a multicast message to the given multicast domain;

means for receiving the multicast message at the configured network device; and means for forwarding the received multicast message to the responsible network device for the multicast traffic referenced in the received multicast message.

38. The apparatus according to claim 37, further comprising:

means for generating a peering relationship between the configured network device and a network device in another multicast domain.

39. The apparatus according to claim 37, further comprising:

means for receiving at the configured network device a second multicast message sent from a responsible network device in the given multicast domain; and means for forwarding the received multicast message to the peered network device in the another multicast domain.

40. The apparatus according to claim 37 wherein the configured network device is also a responsible network device.

41. The apparatus according to claim 37 wherein the configured network device generates a peering relationship with all of the responsible network devices in the given multicast domain, thereby coordinating all of the multicast messages in the given multicast domain.

42. The apparatus according to claim 37 wherein the configured network device generates a peering relationship with a subset of the responsible network devices in the given multicast domain, thereby coordinating a subset of the multicast messages in the given multicast domain.

43. The apparatus according to claim 37 wherein the given multicast domain is a protocol independent multicast domain.

44. An apparatus for minimizing multicast traffic in a network, the apparatus comprising:

means for configuring a network device In a given multicast domain to coordinate multicast messages sent to and from the given multicast domain, wherein one or more bits in one or more fields of each of the. multicast protocol messages are set as the alerts for the coordinating capabilities of the configured network device;

means for constructing an information message that alerts network devices of the coordinating capabilities of the configured network device; and means for forwarding the information message to at least one other multicast domain.

45. The apparatus according to claim 44 wherein the information message is a part of a multicast protocol message.

* * * * *